(12) United States Patent
Shiraishi

(10) Patent No.: US 11,763,463 B2
(45) Date of Patent: Sep. 19, 2023

(54) INFORMATION PROCESSING APPARATUS, CONTROL METHOD, AND PROGRAM

(71) Applicant: NEC Corporation, Tokyo (JP)

(72) Inventor: Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 57 days.

(21) Appl. No.: 17/349,045

(22) Filed: Jun. 16, 2021

(65) Prior Publication Data
US 2021/0343026 A1 Nov. 4, 2021

Related U.S. Application Data

(63) Continuation of application No. 16/623,656, filed as application No. PCT/JP2017/022875 on Jun. 21, 2017.

(51) Int. Cl.
*G06T 7/20* (2017.01)
*G06T 7/73* (2017.01)
(Continued)

(52) U.S. Cl.
CPC .............. *G06T 7/20* (2013.01); *G06T 7/248* (2017.01); *G06T 7/74* (2017.01); *G06V 10/255* (2022.01);
(Continued)

(58) Field of Classification Search
CPC . G06T 7/248; G06T 7/74; G06T 2207/10028; G06T 2207/30196; G06T 2207/10016; G06T 2207/10021; G06T 2207/20081; G06T 2207/30232; G06T 7/73; G06T 7/20; G06V 10/25;
(Continued)

(56) References Cited

U.S. PATENT DOCUMENTS

2010/0134611 A1 6/2010 Naruoka et al.
2010/0215257 A1* 8/2010 Dariush ............... G06V 40/103
382/164
(Continued)

FOREIGN PATENT DOCUMENTS

JP 2000-331170 A 11/2000
JP 2010-271872 A 2/2010
(Continued)

OTHER PUBLICATIONS

Office Action, dated Apr. 13, 2021, for Japanese Patent Application No. 2019-524778 (5 pages with English translation).
(Continued)

*Primary Examiner* — Stephen P Coleman

(57) ABSTRACT

An information processing apparatus (2000) analyzes a captured image (12) generated by a camera (10) to determine a motion of a person. The camera (10) is a camera that images a display place where an item is displayed. The information processing apparatus (2000) detects a reference position (24) from the captured image (12). The reference position (24) indicates a position of a hand of the person. The information processing apparatus (2000) decides an analysis target region (30) to be analyzed in the captured image (12) using the reference position (24). The information processing apparatus (2000) analyzes the analysis target region (30) to determine the motion of the person.

11 Claims, 14 Drawing Sheets

(51) Int. Cl.
*G06T 7/246* (2017.01)
*G06V 40/10* (2022.01)
*G06V 10/20* (2022.01)
*G06V 20/52* (2022.01)
*G06V 40/20* (2022.01)

(52) U.S. Cl.
CPC ............ *G06V 20/52* (2022.01); *G06V 40/107* (2022.01); *G06V 40/28* (2022.01); *G06T 2207/10028* (2013.01); *G06T 2207/30196* (2013.01)

(58) Field of Classification Search
CPC .... G06V 40/107; G06V 10/255; G06V 20/52; G06V 40/28; G08B 13/196; G06Q 30/02
USPC .......................................................... 382/103
See application file for complete search history.

(56) References Cited

U.S. PATENT DOCUMENTS

| | | | |
|---|---|---|---|
| 2011/0298791 A1* | 12/2011 | Adachi | H04N 13/128 345/419 |
| 2013/0182898 A1* | 7/2013 | Maeda | G06V 40/28 382/103 |
| 2014/0092013 A1* | 4/2014 | Hildreth | G06F 3/017 345/157 |
| 2014/0132728 A1 | 5/2014 | Verano et al. | |
| 2015/0019391 A1* | 1/2015 | Kumar | G07G 1/0036 705/28 |
| 2015/0154449 A1 | 6/2015 | Ito et al. | |

FOREIGN PATENT DOCUMENTS

| | | |
|---|---|---|
| JP | 2011-233119 A | 11/2011 |
| JP | 2012-113661 A | 6/2012 |
| JP | 2015-041194 A | 3/2015 |
| JP | 2015-106281 A | 6/2015 |
| JP | 2016-162072 A | 9/2016 |
| JP | 2017-049662 A | 3/2017 |
| WO | 2011/007390 A1 | 1/2011 |

OTHER PUBLICATIONS

Japanese Office Action for JP Application No. 2019-524778 dated Aug. 5, 2021.
Ikemura, Sho et al. Action Classification by Joint Boosting Using Spatiotemporal and Depth Information, 2010 The Insitutute of Electrical Engineers of Japan, 2010-00746-006, pp. 1554-1560.
International Search Report corresponding to PCT/JP2017/022875, 2 pages, dated Jul. 25, 2017.
Ito, Masatsugu et al, Hand and Object Tracking System for Producing Video-based Multimedia—Robust and realtime tracking by multiple vision sensors,The Institute of Electronics, Information and Communication Engineers, Technical Report of Ieice, PRMU2002-26(Jun. 2002) pp. 53-50.
U.S. Office Action and PTO-892 for U.S. Appl. No. 16/623,656 dated Sep. 9, 2021.
JP Office Action for JP Application No. 2021-112713, dated Jul. 26, 2022 with English Translation.
Yamamoto et al., "Investigation of Customer Behavior Analysis Based on Top-View Depth Camera", IEEE, 2017 IEEE Winter Applications of Computer Vision Workshops (WACVW), pp. 1-9.
U.S. Office Action and PTO-892 for U.S. Appl. No. 16/623,656 dated Jan. 3, 2022.

* cited by examiner

Y-AXIS DIRECTION OF
CAPTURED IMAGE 12

Y-AXIS DIRECTION OF
CAPTURED IMAGE 12

INFORMATION PROCESSING APPARATUS, CONTROL METHOD, AND PROGRAM

CROSS-REFERENCE TO RELATED APPLICATIONS

This application is a continuation application of U.S. patent application Ser. No. 16/623,656, filed on Dec. 17, 2019, which is a national stage application of International Application No. PCT/JP2017/022875 entitled "INFORMATION PROCESSING APPARATUS, CONTROL METHOD, AND PROGRAM," filed on Jun. 21, 2017, the disclosure of which is hereby incorporated by reference in its entirety.

TECHNICAL FIELD

Technical Field

The present invention relates to image analysis.

Background Art

In a store, a customer takes out and purchases a product displayed in a display place (for example, a product shelf). The customer may return the product once picked up to the display place. Techniques of analyzing such an action of the customer related to the product displayed are developed.

For example, Patent Document 1 discloses a technique of detecting that an item (a hand of person) enters a determined region (shelf) using a depth image obtained from an imaging result by a depth camera and determining a motion of a customer using a color image near an entry position before and after the entry. Specifically, a color image including a hand of a person entering the determined region is compared with a color image including the hand of the person leaving the determined region to respectively determine the motions of the person as "acquisition of product" in a case where an increase in a color exceeds a threshold value, "return of product" in a case where a decrease in the color exceeds a threshold value, and "contact" in a case where a change in the color is less than a threshold value. Further, Patent Document 1 discloses a technique of deciding the increase or decrease in a volume of a subject from information on a size of the subject obtained from the imaging result of the depth camera to distinguish between the acquisition and the return of the product.

RELATED DOCUMENT

Patent Document

[Patent Document 1] US Patent Application No. 2014/0132728

SUMMARY OF THE INVENTION

Technical Problem

A degree of increase or decrease in color or volume before and after the entry of the hand of the person into the display place is affected by, for example, changes in a size of the product or a pose of the hand of the person. For example, in a case where a small product is taken out from the display place, the increase in color and volume before and after that is small. Further, a motion of changing the pose of the hand may be erroneously recognized as the motion of acquiring the product.

The present invention is made in view of the above problems. One of the objects of the present invention is to provide a technique of determining a motion of a person with respect to a displayed item with high accuracy.

Solution to Problem

The information processing apparatus according to the present invention includes: 1) a detection unit that detects a reference position indicating a position of a hand of a person included in a captured image from the captured image in which a display place of an item is imaged; 2) a deciding unit that decides an analysis target region in the captured image using the detected reference position and decides the analysis target region; and 3) a determination unit that analyzes the decided analysis target region to determine a motion of the person.

A control method of the present invention is executed by a computer. The control method includes: 1) a detection step of detecting a reference position indicating a position of a hand of a person included in a captured image from the captured image in which a display place of an item is imaged; 2) a deciding step of deciding an analysis target region in the captured image using the detected reference position and deciding the analysis target region; and 3) a determination step of analyzing the decided analysis target region to determine a motion of the person.

A program of the present invention causes a computer to execute each step of the control method of the present invention.

Advantageous Effects of Invention

According to this invention, there is provided the technique of determining the motion of the person with respect to the displayed item with high accuracy.

BRIEF DESCRIPTION OF THE DRAWINGS

The objects described above and other objects, features, and advantages will become more apparent from preferred example embodiments described below and the following drawings accompanying the example embodiments.

DESCRIPTION OF EMBODIMENTS

Figure 1:
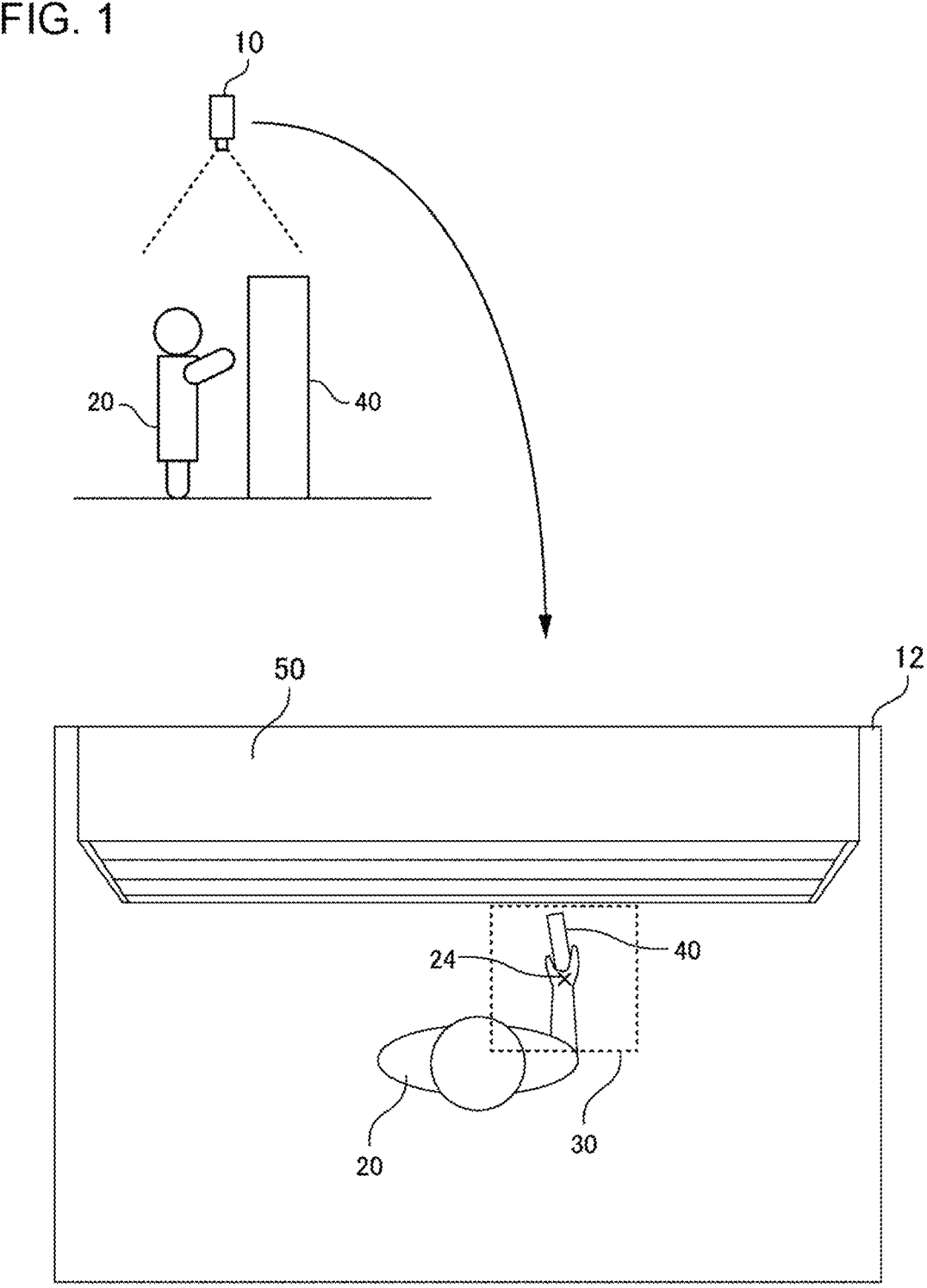
FIG. 1 is a diagram conceptually illustrating an operation of an information processing apparatus according to an example embodiment 1.

Hereinafter, example embodiments of the present invention will be described with reference to drawings. Note that, in all the drawings, the same reference numeral is assigned to the same component and the description thereof will not be repeated. Further, each block represents a configuration of functional units instead of a configuration of hardware units in each block diagram, unless otherwise described.

Example Embodiment 1

Outline of Operation of Information Processing Apparatus 2000

FIG. 1 is a diagram conceptually illustrating an operation of an information processing apparatus according to an example embodiment 1 (information processing apparatus 2000 shown in FIG. 2 and the like described below). Note that FIG. 1 is an illustration for easily understanding the operation of the information processing apparatus 2000 and the operation of the information processing apparatus 2000 is not limited by FIG. 1.

The information processing apparatus 2000 analyzes a captured image 12 generated by a camera 10 to determine a motion of a person. The camera 10 is a camera that images a display place where an item is displayed. The camera 10 repeatedly performs imaging and generates a plurality of captured images 12. The plurality of generated captured images 12 are, for example, a frame group that constitutes video data. However, the plurality of captured images 12 generated by the camera 10 do not necessarily need to constitute the video data and may be handled as individual still image data.

An item to be imaged by the camera 10 can be any item that is displayed at the display place, and is taken out from the display place by a person or is placed (returned) in the display place by a person on the contrary. A specific item to be imaged by the camera 10 varies depending on a usage environment of the information processing apparatus 2000.

For example, it is assumed that the information processing apparatus 2000 is used to determine the motion of a customer or a store clerk in a store. In this case, the item to be imaged by the camera 10 is a product sold in the store. Further, the display place described above is, for example, a product shelf. In FIG. 1, the information processing apparatus 2000 is used to determine the motion of a customer 20. Therefore, the person and the item to be imaged by the camera 10 are respectively the customer 20 and a product 40. Further, the display place is a product shelf 50.

In addition, it is assumed that the information processing apparatus 2000 is used to determine the motion of a factory worker or the like. In this case, the person to be imaged by the camera 10 is the worker or the like. Further, the item to be imaged by the camera 10 is a material, a tool, or the like which is used in the factory. Furthermore, the display place is a shelf installed in, for example, a warehouse of the factory.

For ease of explanation, a case where the information processing apparatus 2000 is used to determine the motion of the customer (customer 20 in FIG. 1) in the store will be described as an example, unless otherwise noted in this specification. Therefore, it is assumed that the "motion of person" determined by the determination unit 2060 is the "motion of customer". Further, it is assumed that the "item" to be imaged by the camera is the "product". Furthermore, it is assumed that the "display place" is the "product shelf".

The information processing apparatus 2000 detects a reference position 24 from the captured image 12. The reference position 24 indicates a position of a hand of the person. The position of the hand of the person is, for example, a center position of the hand or a position of a fingertip. The information processing apparatus 2000 decides a region to be analyzed (analysis target region 30) in the captured image 12 using this reference position 24. The information processing apparatus 2000 analyzes the analysis target region 30 to determine the motion of the customer 20. For example, the motion of the customer 20 is a motion of holding the product 40, a motion of taking out the product 40 from the product shelf 50, or a motion of placing the product 40 on the product shelf 50.

Advantageous Effect

In a case where it is intended that image analysis is performed on the entire captured image 12 to determine the motion of the customer 20, the motion may not be accurately determined when a size of the product 40 is small or when a pose of the hand of the customer 20 varies significantly. In this regard, the information processing apparatus 2000 first detects the reference position 24 indicating the position of the hand of the customer 20 in the captured image 12 and decides the analysis target region 30 based on the reference position 24. That is, the image analysis is performed near the hand of the customer 20. Therefore, even when the size of the product 40 is small or when the pose of the hand of the customer 20 varies significantly, it is possible to determine the motion by the hand of the customer 20 such as acquiring the product 40, placing the product 40, or holding the product 40 with high accuracy.

Hereinafter, the information processing apparatus 2000 according to the present example embodiment will be described in more detail.

Example of Functional Configuration of Information Processing Apparatus 2000

Figure 2:
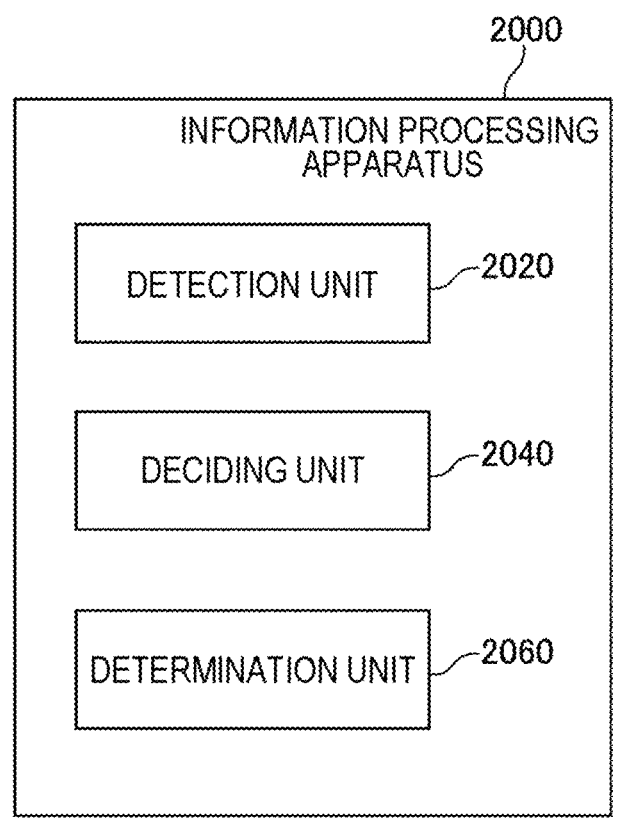
FIG. 2 is a block diagram illustrating an example of a functional configuration of the information processing apparatus according to the example embodiment 1.

FIG. 2 is a block diagram illustrating an example of a functional configuration of the information processing apparatus 2000 according to the example embodiment 1. The information processing apparatus 2000 has a detection unit 2020, a deciding unit 2040, and a determination unit 2060. The detection unit 2020 detects the reference position 24 of the hand of the person included in the captured image 12 from the captured image 12. The deciding unit 2040 decides the analysis target region 30 in the captured image 12 using the detected reference position 24. The determination unit 2060 analyzes the decided analysis target region 30 to determine the motion of the person.

Example of Hardware Configuration of Information Processing Apparatus 2000

Each functional configuration unit of the information processing apparatus 2000 may be formed by hardware (for example, a hard-wired electronic circuit) that forms each functional configuration unit or a combination of hardware and software (for example, a combination of an electronic circuit and a program that controls the circuit). Hereinafter, the case where each functional configuration unit of the information processing apparatus 2000 is formed by the combination of hardware and software will be further described.

Figure 3:
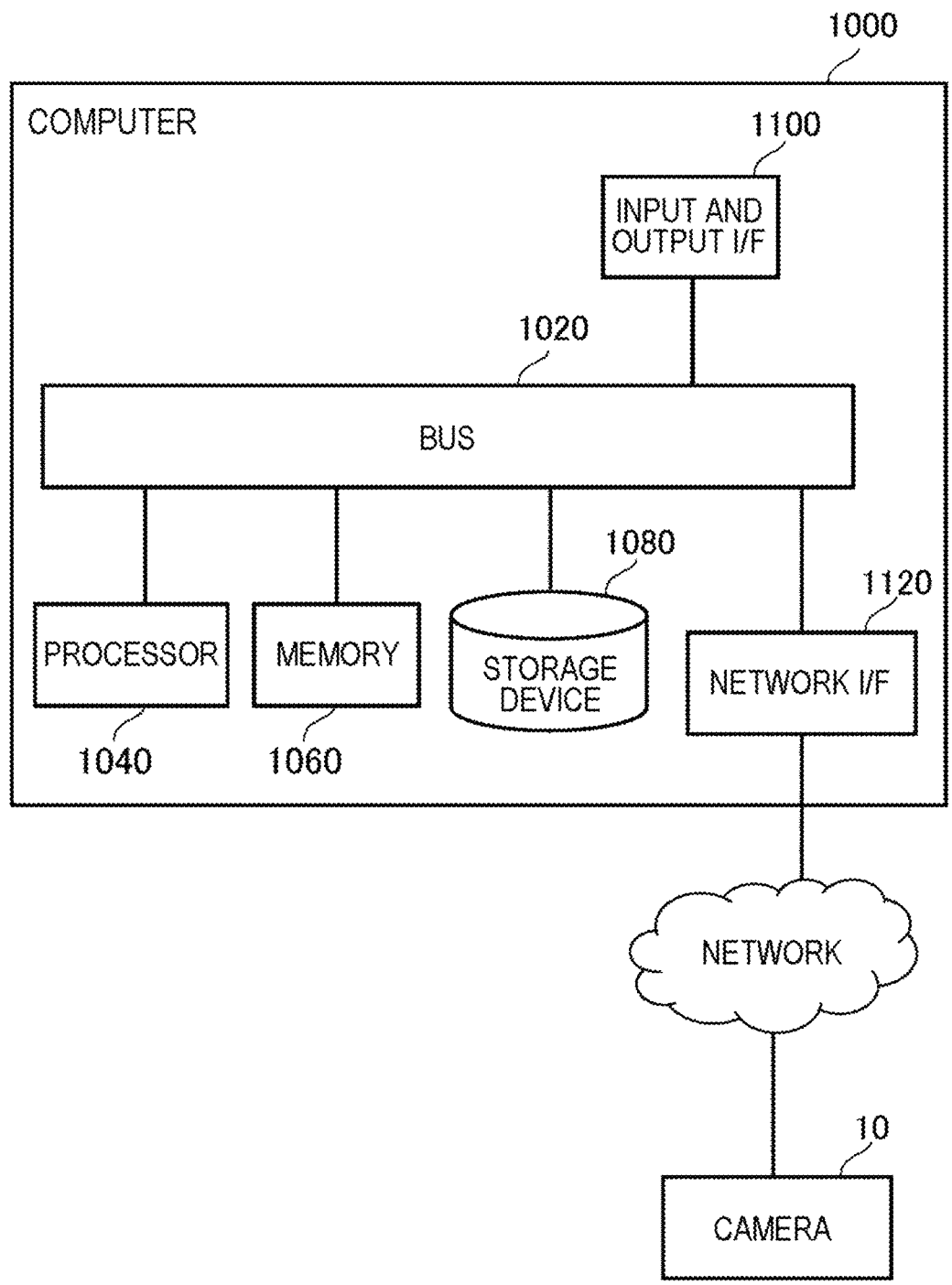
FIG. 3 is a diagram illustrating a computer for forming the information processing apparatus.

FIG. 3 is a diagram illustrating a computer 1000 for forming the information processing apparatus 2000. The computer 1000 is a variety of computers. For example, the computer 1000 is a personal computer (PC), a server machine, a tablet terminal, or a smartphone. In addition, for example, the computer 1000 may be the camera 10. The computer 1000 may be a dedicated computer designed to form the information processing apparatus 2000 or may be a general-purpose computer.

The computer 1000 has a bus 1020, a processor 1040, a memory 1060, a storage device 1080, an input and output interface 1100, and a network interface 1120. The bus 1020 is a data transmission path for the processor 1040, the memory 1060, the storage device 1080, the input and output interface 1100, and the network interface 1120 to mutually transmit and receive data. However, a method of mutually connecting the processors 1040 and the like is not limited to the bus connection. The processor 1040 is an arithmetic apparatus such as a central processing unit (CPU) or a graphics processing unit (GPU). The memory 1060 is a main storage apparatus formed by a random access memory (RAM) or the like. The storage device 1080 is an auxiliary storage apparatus formed by a hard disk, a solid state drive (SSD), a memory card, a read only memory (ROM), or the like. However, the storage device 1080 may be configured by hardware similar to the hardware used to configure the main storage apparatus, such as the RAM.

The input and output interface 1100 is an interface for connecting the computer 1000 to an input and output device. The network interface 1120 is an interface for connecting the computer 1000 to a communication network. This communication network is, for example, a local area network (LAN) or a wide area network (WAN). The method of connecting the network interface 1120 to the communication network may be a wireless connection or a wired connection.

For example, the computer 1000 is connected to the camera 10 in a communicable manner through a network. However, the method of connecting the computer 1000 to the camera 10 in a communicable manner is not limited to connection through the network. However, the computer 1000 does not necessarily need to be connected to the camera 10 in a communicable manner as long as the captured image 12 generated by the camera 10 is acquired.

The storage device 1080 stores program modules to form the respective functional configuration units (the detection unit 2020, the deciding unit 2040, and the determination unit 2060) of the information processing apparatus 2000. The processor 1040 reads each of the program modules into the memory 1060 and executes each program module to realize a function corresponding to each program module.

<About Camera 10>

The camera 10 is any camera that can repeatedly perform the imaging and generate the plurality of captured images 12. The camera 10 may be a video camera that generates the video data or a still camera that generates still image data. Note that the captured image 12 is a video frame constituting the video data in the former case.

The camera 10 may be a two-dimensional camera or a three-dimensional camera (stereo camera or depth camera). Note that the captured image 12 may be a depth image in a case where the camera 10 is the depth camera. The depth image is an image in which a value of each pixel of the image represents a distance between an imaged item and the camera. Furthermore, the camera 10 may be an infrared camera.

As described above, the computer 1000 that forms the information processing apparatus 2000 may be the camera 10. In this case, the camera 10 analyzes the captured image 12 generated by itself to determine the motion of the customer 20. As the camera 10 having such a function, for example, an intelligent camera, a network camera, or a camera called an Internet protocol (IP) camera can be used.

<Flow of Processing>

Figure 4:
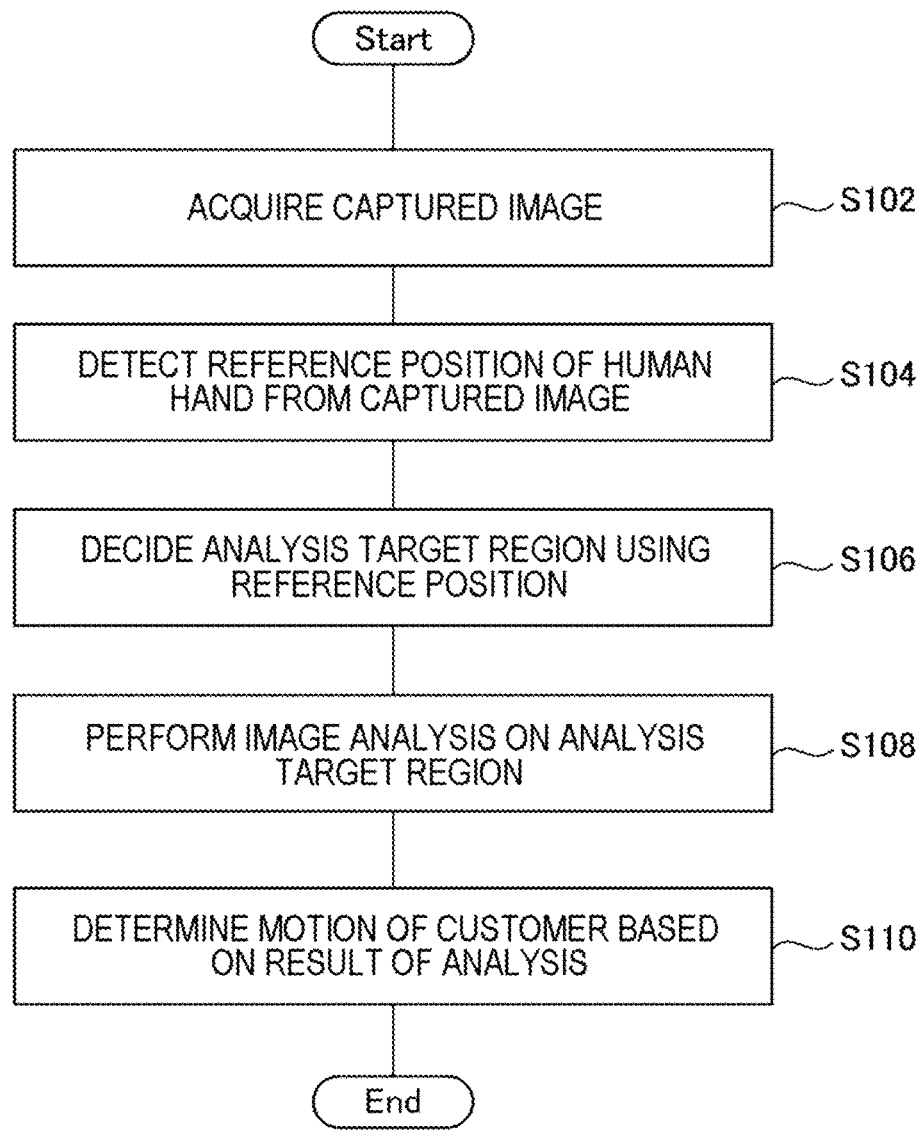
FIG. 4 is a flowchart illustrating a flow of processing executed by the information processing apparatus according to the example embodiment 1.

FIG. 4 is a flowchart illustrating a flow of processing executed by the information processing apparatus 2000 according to the example embodiment 1. The detection unit 2020 acquires the captured image 12 (S102). The detection unit 2020 detects the reference position 24 of the hand of the product 40 from the acquired captured image 12 (S104). The deciding unit 2040 decides the analysis target region 30 using the detected reference position 24 (S106). The determination unit 2060 performs the image analysis on the decided analysis target region 30 (S108). The determination unit 2060 determines the motion of the customer 20 based on the result of the image analysis of the analysis target region 30 (S108).

Here, the plurality of captured images 12 may be used to determine the motion of the customer 20. In this case, the image analysis is performed on the analysis target regions 30 decided for each of the plurality of captured images 12 (image analysis is performed on a plurality of analysis target regions 30) to determine the motion of the customer 20. That is, the processing of S102 to S108 is performed for each of the plurality of captured images 12, and the processing of S110 is performed using the result.

<Timing when Information Processing Apparatus 2000 Executes Processing>

There are various timings when the information processing apparatus 2000 executes a series of pieces of processing shown in FIG. 4. For example, each time the captured image 12 is generated by the camera 10, the information processing apparatus 2000 executes the series of pieces of processing shown in FIG. 4 for the captured image 12.

In addition, for example, the information processing apparatus 2000 executes the series of pieces of processing shown in FIG. 4 at a predetermined time interval (for example, every second). In this case, for example, the information processing apparatus 2000 acquires the latest captured image 12 generated by the camera 10 at the timing of starting the series of pieces of processing shown in FIG. 4.

<Acquisition of Captured Image 12: S102>

The detection unit 2020 acquires the captured image 12 (S102). Any method of the detection unit 2020 to acquire the captured image 12 may be employed. For example, the detection unit 2020 receives the captured image 12 transmitted from the camera 10. Further, for example, the detection unit 2020 accesses the camera 10 and acquires the captured image 12 stored in the camera 10.

Note that the camera 10 may store the captured image 12 in a storage apparatus provided outside the camera 10. In this case, the detection unit 2020 accesses the storage apparatus and acquires the captured image 12.

In a case where the information processing apparatus 2000 is formed by the camera 10, the information processing apparatus 2000 acquires the captured image 12 generated by the information processing apparatus 2000 itself. In this case, the captured image 12 is stored in, for example, the memory 1060 or the storage device 1080 (refer to FIG. 3) inside the information processing apparatus 2000. Therefore, the detection unit 2020 acquires the captured image 12 from the memory 1060 or the storage device 1080.

Figure 5:
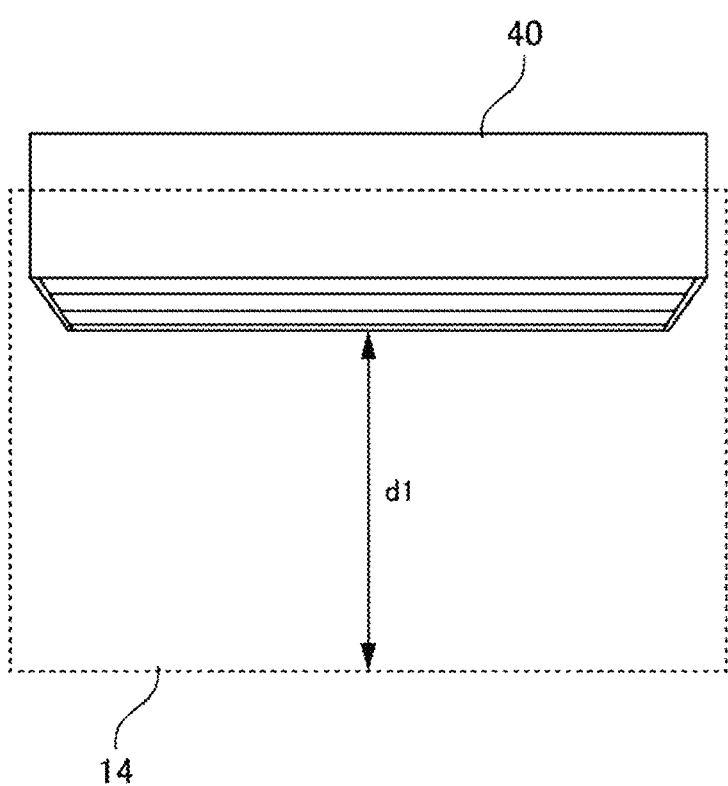
FIG. 5 is a first diagram illustrating an imaging range of a camera.

The captured image 12 (that is, an imaging range of the camera 10) includes at least a range in front of the product shelf 50. FIG. 5 is a first diagram illustrating the imaging range of the camera 10. In FIG. 5, an imaging range 14 of the camera 10 includes a range of a distance d1 from the front surface of the product shelf 50 to the front side.

Figure 6:
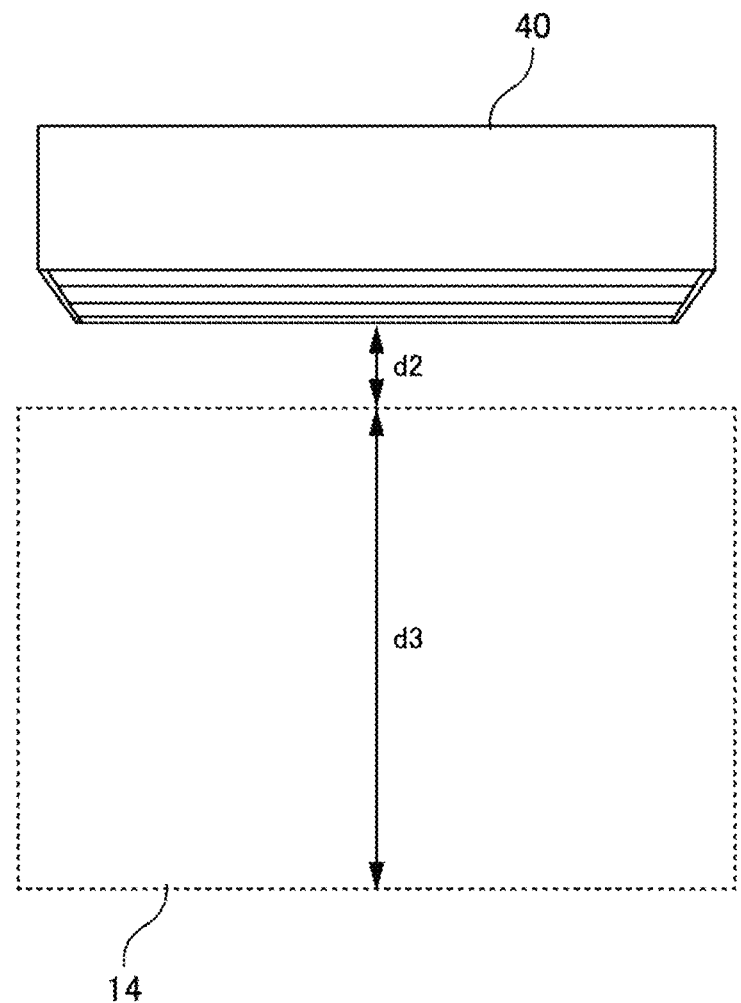
FIG. 6 is a second diagram illustrating the imaging range of the camera.

Note that the imaging range of the camera 10 may not include the product shelf 50. FIG. 6 is a second diagram illustrating the imaging range of the camera 10. In FIG. 6, the imaging range 14 of the camera 10 includes a range from a position apart from the front surface of the product 40 to the front side by d2 to a position apart from the front side of the product 40 to the front side by d3.

Figure 7:
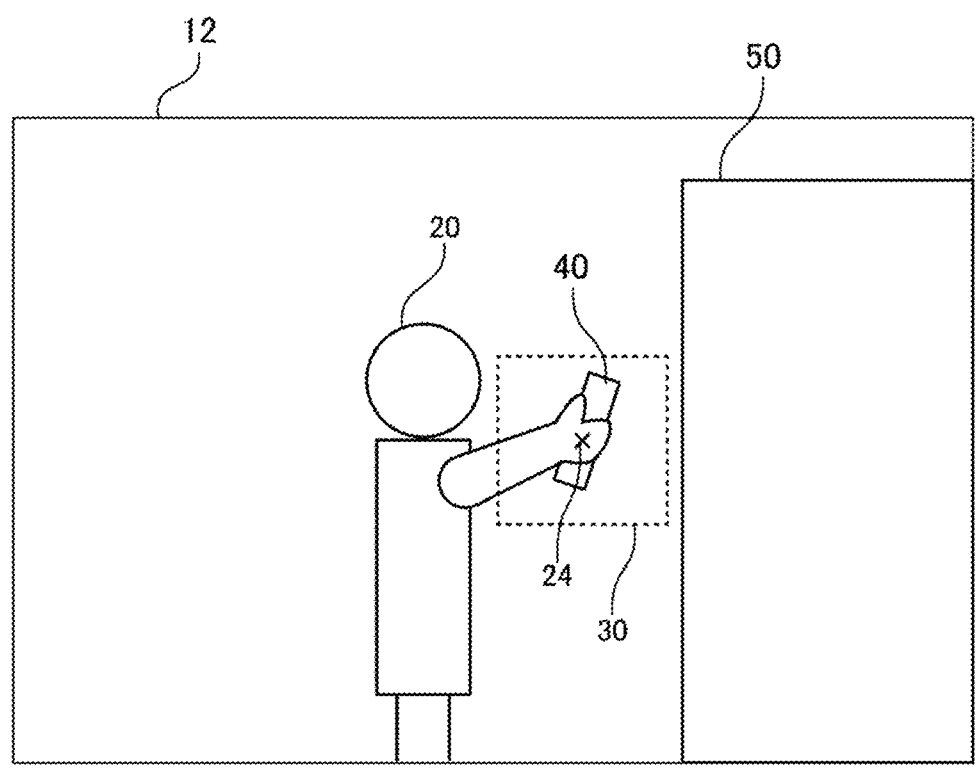
FIG. 7 is a diagram illustrating a case where a captured image includes a scene in which a product shelf is imaged from the right side as viewed from the front.

Further, the captured images 12 in FIGS. 5 and 6 include scenes in which the product shelf 50 is viewed down from above. In other words, the camera 10 is installed so as to image the product shelf 50 from above the product shelf 50. However, the captured image 12 may not include the scene in which the product shelf 50 is viewed down from above. For example, the captured image 12 may include a scene in which the product shelf 50 is imaged from the side. FIG. 7 is a diagram illustrating a case where the captured image 12 includes a scene in which the product shelf 50 is imaged from the right side as viewed from the front.

<Detection of Reference Position 24: S104>

The detection unit 2020 detects the reference position 24 from the captured image 12 (S104). As described above, the reference position 24 indicates the position of the hand of the customer 20. As described above, the position of the hand of the customer 20 is, for example, the center position of the hand or the position of the fingertip. There are various methods for the detection unit 2020 to detect the reference position 24 from the captured image 12. For example, the detection unit 2020 performs feature value matching using a feature value of the hand of the person, which is prepared in advance, to detect a region matching the feature value (with high similarity to the feature value) from the captured image 12. The detection unit 2020 detects a predetermined position (for example, center position) of the detected region, that is, a region representing the hand as the reference position 24 of the hand.

In addition, for example, the detection unit 2020 may detect the reference position 24 using machine learning. Specifically, the detection unit 2020 is configured as a detector using the machine learning. In this case, the detection unit 2020 is caused to learn in advance using one or more captured images (a set of a captured image and coordinates of the reference position 24 in the captured image) in which the reference positions 24 are known. With this, the detection unit 2020 can detect the reference position 24 from the acquired captured image 12. Note that various models such as a neural network can be used as a machine learning prediction model.

Here, the learning of the detection unit 2020 is preferably performed on the hand of the customer 20 in various poses. Specifically, captured images for learning are prepared for the hand of customers 20 in various poses. With this, it is possible to detect the reference position 24 from each captured image 12 with high accuracy even though the pose of the hand of the customer 20 is different for each captured image 12.

Here, the detection unit 2020 may detect various parameters relating to the hand of the customer 20 in addition to the reference position 24. For example, the detection unit 2020 detects a width, length, and pose of the hand, and a distance between the reference position 24 and the camera 10. In a case where the feature value matching is used, the detection unit 2020 determines the width, length, pose, and the like of the hand from a shape and size of a detected hand region. In a case where the machine learning is used, the detection unit 2020 is caused to learn using one or more captured images in which the width, length, and pose of the hand, the distance between the reference position 24 and the camera 10, and the like are known. With this, it is possible for the detection unit 2020 to detect various parameters such as the hand width in addition to the reference position 24 from the acquired captured image 12.

<Decision of Analysis Target Region 30: S106>

The deciding unit 2040 decides the analysis target region 30 using the detected reference position 24 (S106). There are various methods for the deciding unit 2040 to decide the analysis target region 30. For example, the deciding unit 2040 is a region having a predetermined shape defined with the reference position 24 as a reference among the regions included in the captured image 12.

FIG. 8 are diagrams illustrating the analysis target region 30 that is decided as the region having the predetermined shape defined with the reference position 24 as the reference. FIG. 8A represents a case where the reference position 24 is used as a position representing a predetermined position of the analysis target region 30. Specifically, the analysis target region 30 in FIG. 8A is a rectangle with the reference position 24 as the center. The analysis target region 30 is a rectangle having a height h and a width w. Note that the reference position 24 may be used as a position that defines a position other than the center of the analysis target region 30 such as the upper left end or lower right end of the analysis target region 30.

Figure 8A:
FIGS. 8A and 8B are diagrams illustrating an analysis target region that is decided as a region having a predetermined shape defined with a reference position as a reference.
Figure 8A:
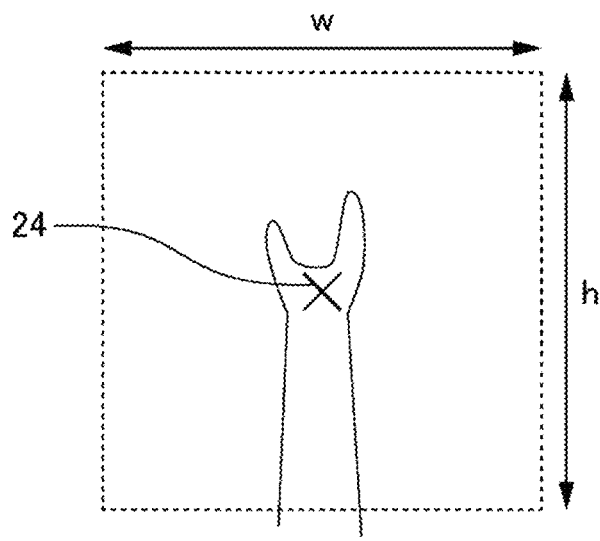
Figure 8B:
Figure 8B:
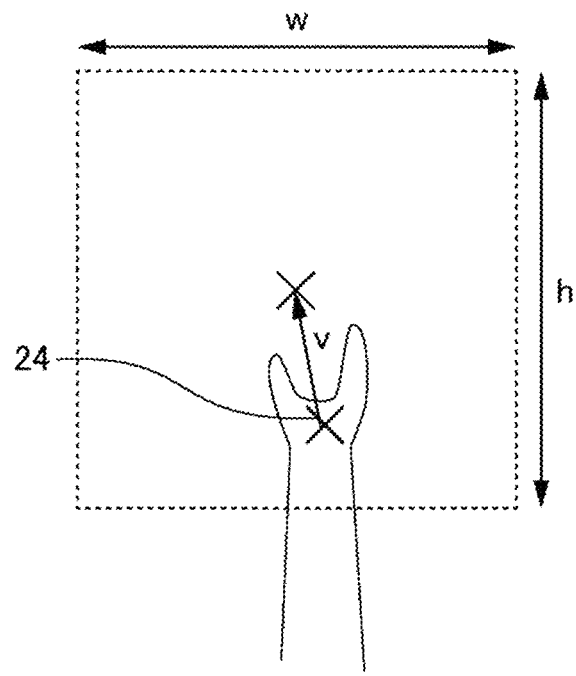

FIG. 8B represents a case where a predetermined position (center, upper left corner, or the like) of the analysis target region 30 is defined by a position having a predetermined relationship with the reference position 24. Specifically, the analysis target region 30 in FIG. 8B is a rectangle with a position moved by a predetermined vector v from the reference position 24 as the center. The size and orientation of the rectangle are the same as the analysis target region 30 in FIG. 8A.

In the example of FIG. 8, the orientation of the analysis target region 30 is defined based on an axial direction of the captured image 12. More specifically, a height direction of the analysis target region 30 is defined as a Y-axis direction of the captured image 12. However, the orientation of the analysis target region 30 may be defined based on a direction other than the axial direction of the captured image 12.

Figure 9:
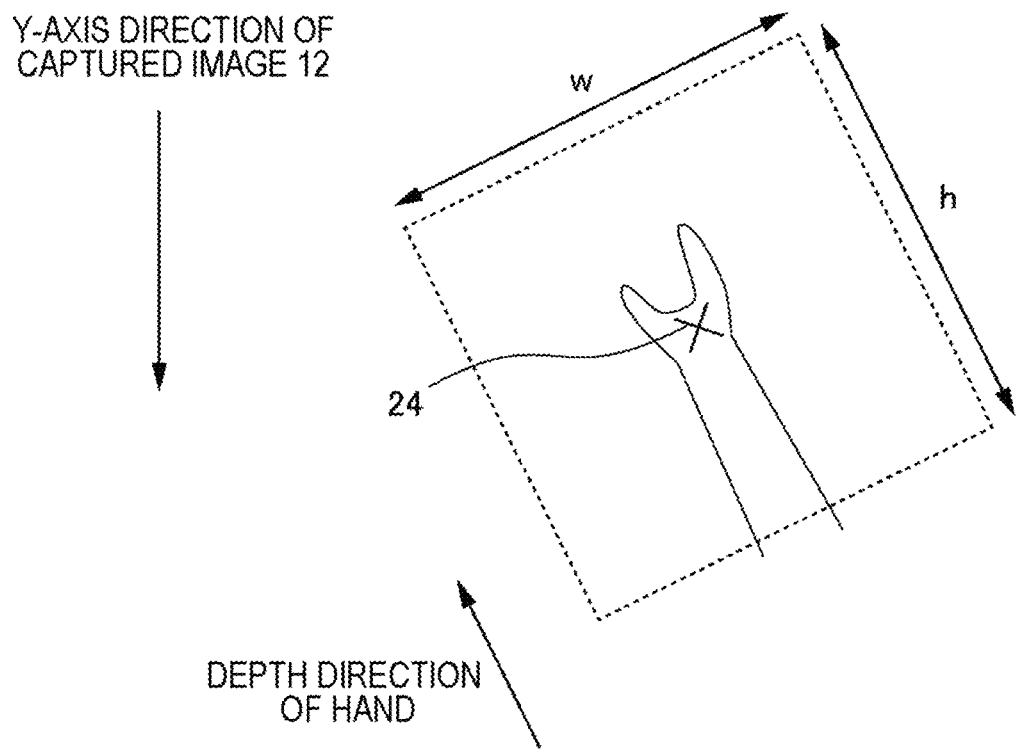
FIG. 9 is a diagram illustrating a case where an orientation of the analysis target region is defined based on an orientation of a hand of a customer.

For example, it is assumed that the detection unit 2020 detects the pose of the hand of the customer 20. In this case, the orientation of the analysis target region 30 may be defined based on the orientation of the hand. FIG. 9 is a diagram illustrating a case where the orientation of the analysis target region 30 is defined based on the orientation of the hand of the customer 20. In FIG. 9, the orientation of the analysis target region 30 is defined as a depth direction of the hand (direction from the wrist to the fingertip).

Note that the orientation of the analysis target region 30 in each of the plurality of captured images 12 may be different in a case where the orientation of the analysis target region 30 is defined based on the orientation of the hand of the customer 20 as described above. Therefore, it is preferable that the deciding unit 2040 performs geometric conversion such that the orientations of the plurality of analysis target regions 30 are aligned. For example, the deciding unit 2040 extracts the analysis target region 30 from each captured image 12 and performs the geometric conversion on each extracted analysis target region 30 such that the depth direction of the hand of the customer 20 faces the Y-axis direction.

The size of the analysis target region 30 may be defined statically or may be decided dynamically. In the latter case, the size of the analysis target region 30 is decided by, for example, the following equation (1).

[Equation 1]

$$h = h_b \times \frac{s_r}{s_b}$$
$$w = w_b \times \frac{s_r}{s_b}$$
(1)

The h and w are respectively the height and width of the analysis target region 30. The $s_b$ is a reference area defined in advance for the hand region. The $h_b$ and $w_b$ are respectively the height and width of the analysis target region 30 defined in advance in association with the reference area. The $s_r$ is an area of the hand region detected from the captured image 12 by the detection unit 2020.

In addition, for example, the size of the analysis target region 30 may be dynamically decided using the following equation (2).

[Equation 2]

$$h = h_b \times \frac{d_b}{d_r}$$
$$w = w_b \times \frac{d_b}{d_r}$$
(2)

The h and w are respectively the height and width of the analysis target region 30. The $d_b$ is a reference distance value defined in advance. The $h_b$ and $w_b$ are respectively the height and width of the analysis target region 30 associated with the reference distance value. The $d_r$ is a distance value between the reference position 24 detected from the captured image 12 and the camera 10.

There are various methods of determining the distance value dr. For example, the detection unit 2020 determines the distance value $d_r$ based on a pixel value at the reference position 24 in the depth image generated by the depth camera. In addition, for example, the detection unit 2020 may be configured to detect the distance between the reference position 24 and the camera 10 in addition to the reference position 24 when the detection unit 2020 is configured as the detector using the machine learning.

Here, each pixel of the analysis target region 30 decided by the above method may be corrected, and the corrected analysis target region 30 may be used for the image analysis by the determination unit 2060. The deciding unit 2040 corrects each pixel in the analysis target region 30 using, for example, the following equation (3).

[Equation 3]

$$d_{(x,y)1} = d_{(x,y)0} + (d_r - d_b)$$
(3)

The $d_{(x,y)0}$ is a pixel value before the correction at coordinates (x,y) of the analysis target region 30 in the captured image 12. The $d_{(x,y)1}$ is a pixel value after the correction at the coordinates (x,y) of the analysis target region 30 in the captured image 12.

<Determination of Motion of Customer 20: S108, S110>

The determination unit 2060 performs the image analysis on the decided analysis target region 30 to determine the motion of the customer 20 (S108 and S110). The motion of the customer 20 is, for example, any of (1) motion of taking out the product 40 from the product shelf 50, (2) motion of placing the product 40 on the product shelf 50, (3) motion of not holding the product 40 both before and after the contact with the product shelf 50, and (4) motion of holding the product 40 both before and after the contact with the product shelf 50.

Here, "the contact between the product shelf 50 and the customer 20" means that the image region of the product shelf 50 and the image region of the customer 20 overlap at least partially in the captured image 12, and there is no need for the product shelf 50 and the customer 20 to contact each other in the real space. Further, in (4) described above, a product 40 held by the customer 20 before the contact between the customer 20 and the product shelf 50 may be the same as or different from a product 40 held by the customer 20 after the contact between the customer 20 and the product shelf 50.

Figure 10:
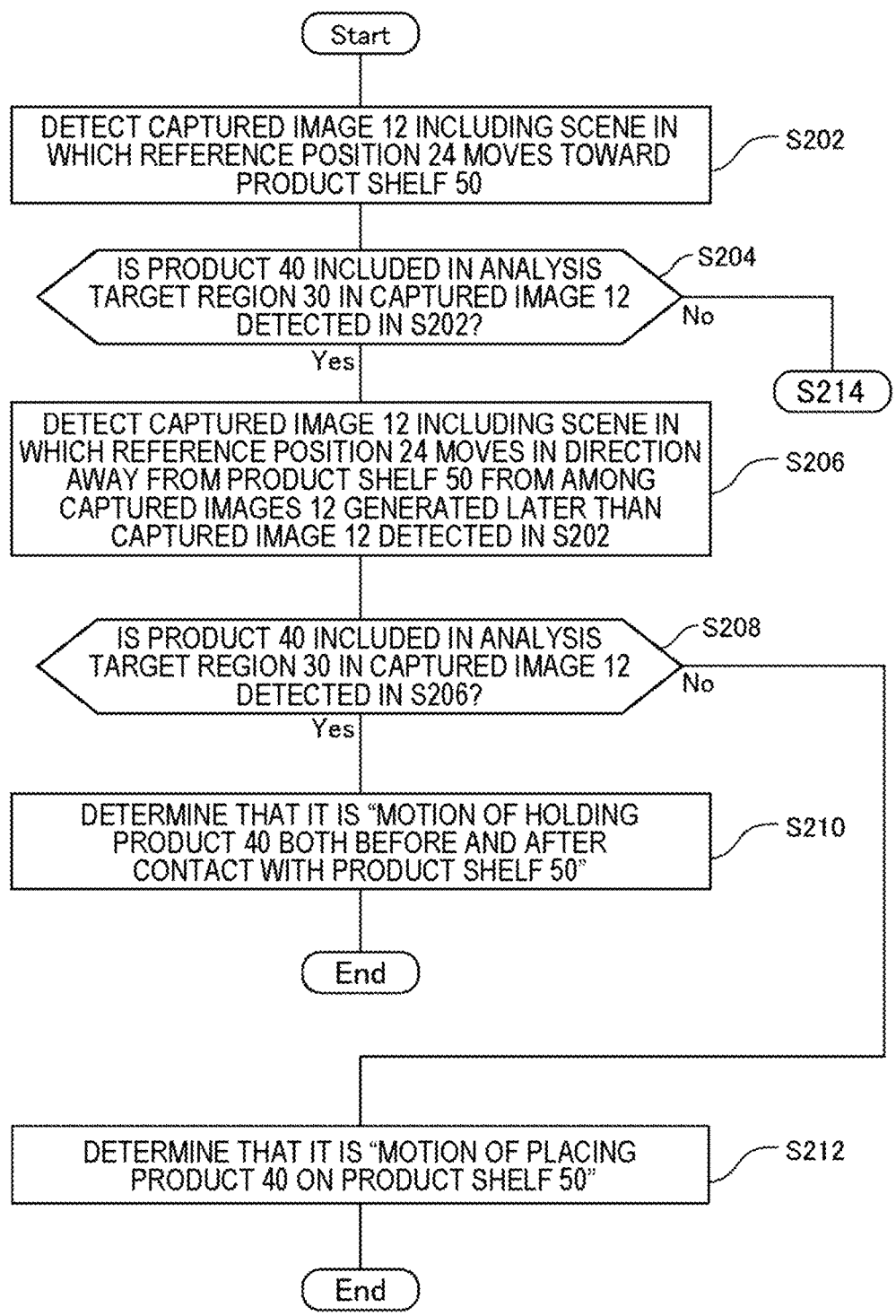
FIG. 10 is a flowchart illustrating a flow of processing for determining a motion of a customer 20.
Figure 11:
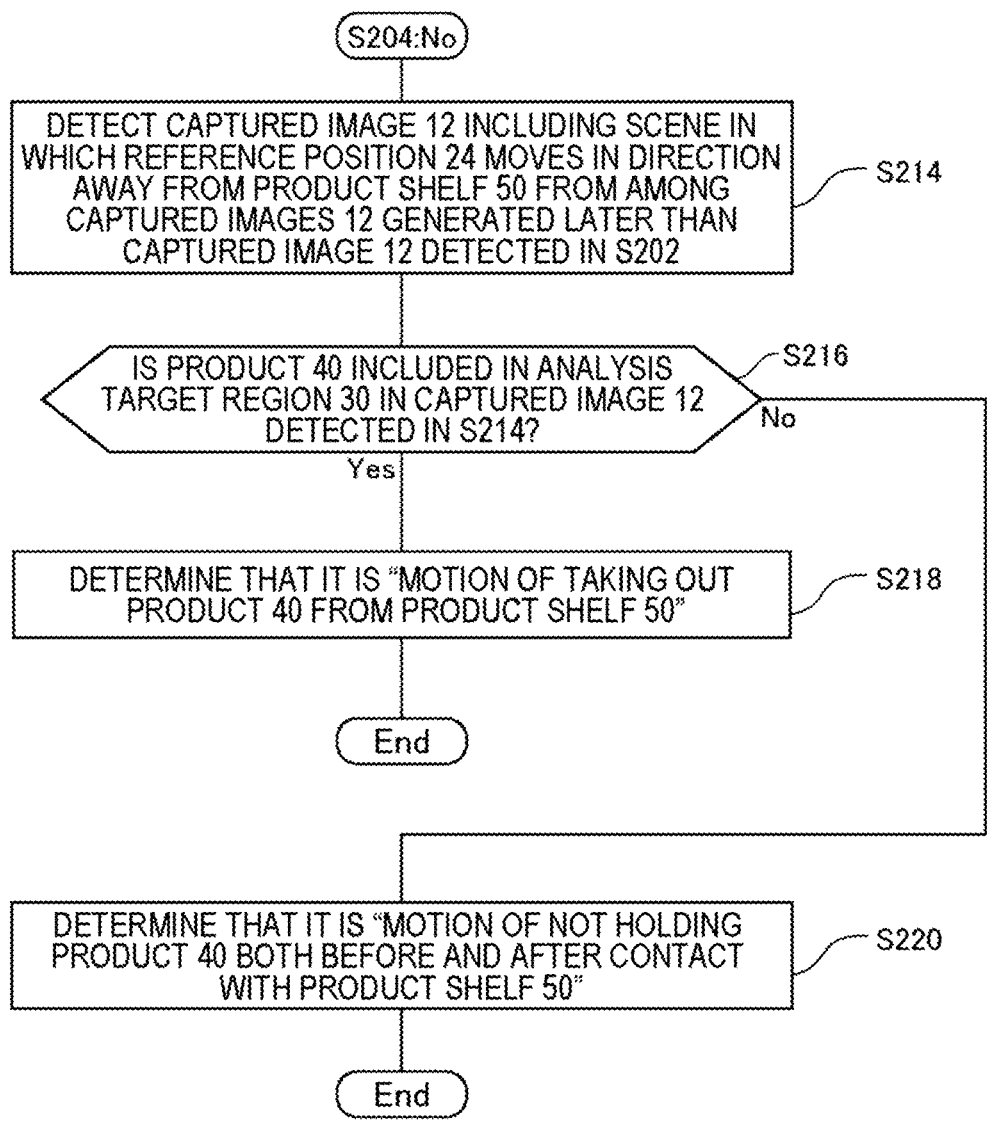
FIG. 11 is a flowchart illustrating the flow of the processing for determining the motion of the customer 20.

A flow of processing of discriminating the four motions described above is, for example, a flow shown in FIG. 10. FIGS. 10 and 11 are flowcharts illustrating the flow of the processing for determining the motion of the customer 20. First, the determination unit 2060 detects the captured image 12 including a scene in which the reference position 24 moves toward the product shelf 50 (S202). For example, the determination unit 2060 computes a distance between the reference position 24 and the product shelf 50 for each of the plurality of captured images 12 in a time series. In a case where the distance decreases over time in one or more captured images 12, the captured images 12 are detected as the captured image 12 including the scene in which the reference position 24 moves toward the product shelf 50.

Furthermore, the determination unit 2060 decides whether the product 40 is included in the analysis target region 30 in the captured image 12 detected in S202 (S204). In a case where the product 40 is included in the analysis target region 30 (YES in S204), the processing in FIG. 10 proceeds to S206. On the other hand, in a case where the product 40 is not included in the analysis target region 30 (NO in S204), the processing in FIG. 10 proceeds to S216.

In S206, the determination unit 2060 detects a captured image 12 including a scene in which the reference position 24 moves in a direction away from the product shelf 50 from among the captured images 12 generated later than the captured image 12 detected in S202 (S206). For example, the determination unit 2060 computes the distance between the reference position 24 and the product shelf 50 for each of the plurality of captured images 12 in a time series generated later than the captured image 12 detected in S202. In a case where the distance increases over time in one or more captured images 12, the captured images 12 are detected as the captured image 12 including the scene in which the reference position 24 moves in the direction away from the product shelf 50.

Furthermore, the determination unit 2060 decides whether the product 40 is included in the analysis target region 30 in the captured image 12 detected in S206 (S208). In a case where the product 40 is included in the analysis target region 30 (YES in S208), the product 40 is held in both a hand moving toward the product shelf 50 and a hand moving in the direction away from the product shelf 50. Therefore, the determination unit 2060 determines that the motion of the customer 20 is "(4) motion of holding the product 40 both before and after the contact with the product shelf 50" (S210).

On the other hand, in a case where the product 40 is not included in the analysis target region 30 (No in S208), the product 40 is not held in the hand moving in the direction away from the product shelf 50 while the product 40 is held in the hand moving toward the product shelf 50. Therefore, the determination unit 2060 determines that the motion of the customer 20 is "(2) motion of placing the product 40 on the product shelf 50" (S212).

In S214, the determination unit 2060 detects the captured image 12 including the scene in which the reference position 24 moves in the direction away from the product shelf 50 from among the captured images 12 generated later than the captured image 12 detected in S202. The detection method is the same as the method executed in S206.

Furthermore, the determination unit 2060 decides whether the product 40 is included in the analysis target region 30 in the captured image 12 detected in S214 (S216). In a case where the product 40 is included in the analysis target region 30 (YES in S216), the product 40 is held in the hand moving in the direction away from the product shelf 50 while the product 40 is not held in the hand moving toward the product shelf 50. Therefore, the determination unit 2060 determines that the motion of the customer 20 is "(1) motion of taking out the product 40 from the product shelf 50" (S218).

On the other hand, in a case where the product 40 is not included in the analysis target region 30 (NO in S216), the product 40 is not held in both the hand moving toward the product shelf 50 and the hand moving in the direction away from the product shelf 50. Therefore, the determination unit 2060 determines that the motion of the customer 20 is "(3) motion of not holding the product 40 both before and after contact with the product shelf 50" (S220).

Here, for example, there is the following method as the method of detecting whether the product 40 is included in the analysis target region 30. The determination unit 2060 first extracts an image region excluding a background region, that is, a foreground region, from the analysis target region 30 decided for each of the plurality of captured images 12 in a time series. Note that an existing technique can be used as a technique of determining the background region for a captured image to be imaged by the camera 10 installed at a predetermined place.

The determination unit 2060 decides that the product 40 is included in the analysis target region 30 in a case where the foreground region includes a region other than the image region representing the hand of the customer 20. However, the determination unit 2060 may decide that the product 40 is included in the analysis target region 30 only in a case where a size of the image region excluding the image region representing the hand in the foreground region is equal to or larger than a predetermined size. With this, it is possible to prevent the noise included in the captured image 12 from being erroneously detected as the product 40.

The method of deciding whether the product 40 is included in the analysis target region 30 is not limited to the method described above. Various existing methods can be used as the method of deciding whether the product 40 is included in the analysis target region 30, that is, whether the hand of the person included in the image has the product.

Note that the determination unit 2060 may determine the motion of the customer 20 from one captured image 12. For example, in this case, the determination unit 2060 determines the motion of the customer 20 as "holding the product 40" or "not holding the product 40".

<Determination of Product 40>

The determination unit 2060 may determine the taken-out product 40 when the customer 20 takes out the product 40 from the product shelf 50. The determination of the product 40 means, for example, that information for identifying the product 40 from other products 40 (for example, an identifier or a name of the product 40) is determined. Hereinafter, the information for identifying the product 40 is referred to as product identification information.

The determination unit 2060 determines a place in the product shelf 50 where the customer 20 takes out the product 40 to determine the taken-out product 40. As a premise, it is assumed that the display place of the product 40 is defined in advance. Here, information indicating which product is displayed at each position of the product shelf 50 is referred to as display information. The determination unit 2060 determines a place in the product shelf 50 from which the customer 20 takes out a product 40 using the captured image 12 and determines the taken-out product 40 using the determined place and the display information.

Figure 12:
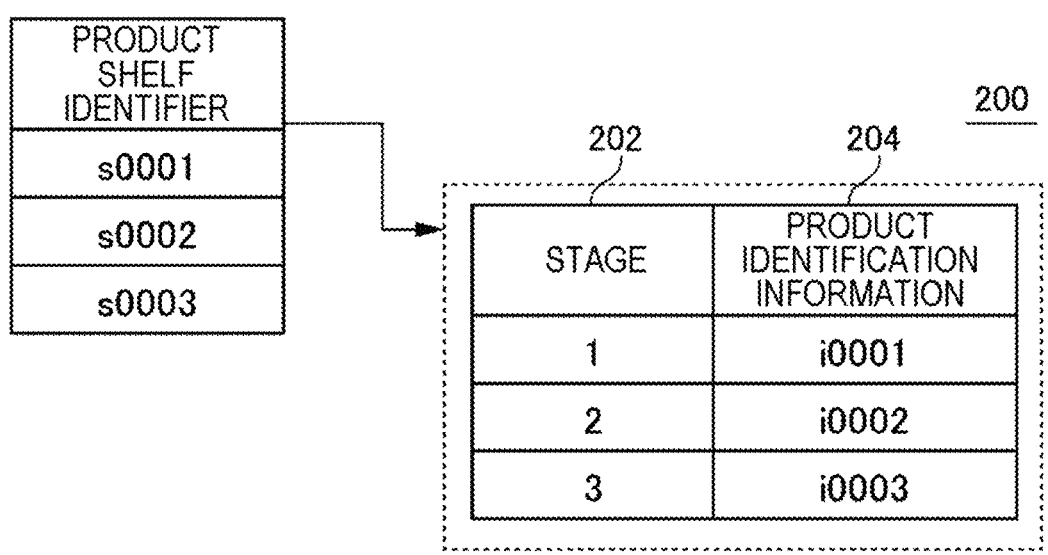
FIG. 12 is a diagram illustrating display information in a table format.

For example, it is assumed that a determined product 40 is displayed for each stage in the product shelf 50. In this case, the display information indicates the product identification information in association with the stage of the product shelf 50. FIG. 12 is a diagram illustrating the display information in a table format. A table shown in FIG. 12 is referred to as a table 200. The table 200 is created for each product shelf 50. The table 200 has two columns of a stage 202 and product identification information 204. In FIG. 12, the product identification information 204 indicates the identifier of the product 40. For example, in the table 200 representing the display information of the product shelf 50 determined by an identifier s0001, a record in a first row displays a product 40 determined by an identifier i0001 in a first stage of the product shelf 50.

The determination unit 2060 determines the stage of the product shelf 50 from which the product 40 is taken out, using the captured image 12. The determination unit 2060 acquires the product identification information associated with the stage in display information to determine the product 40 taken out from the product shelf 50. Hereinafter, several methods of determining the stage of the product shelf 50 from which the product 40 is taken out will be illustrated.

<<First Method>>

Figure 13:
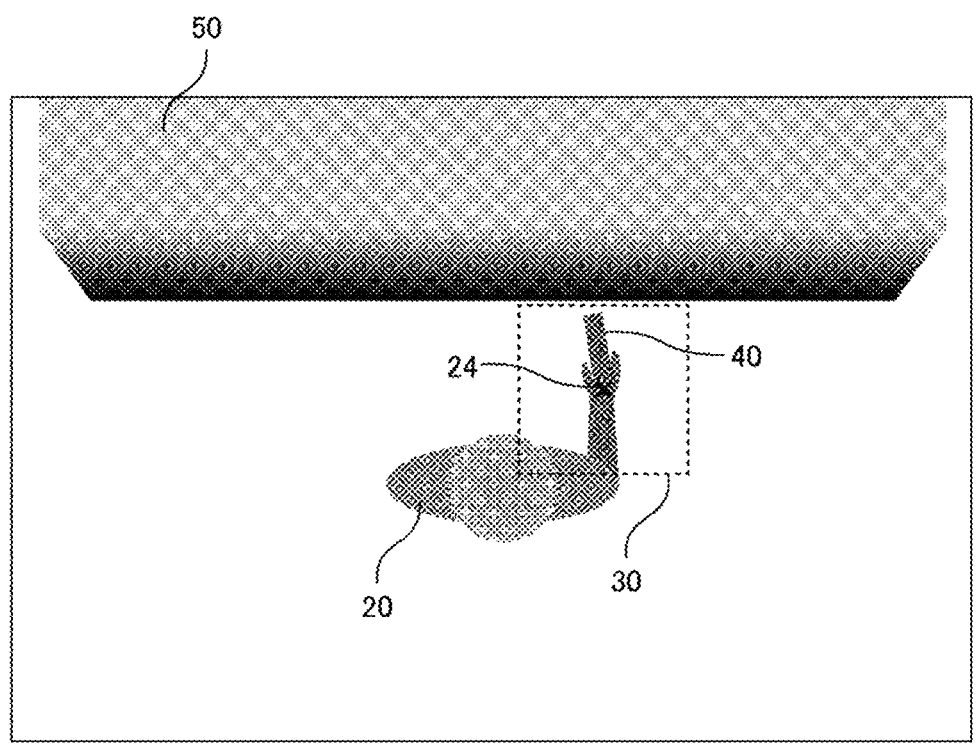
FIG. 13 is a diagram illustrating a depth image generated by the camera.

As a premise, it is assumed that the captured image 12 includes a scene in which the product shelf 50 is imaged from above (refer to FIG. 5). In other words, it is assumed that the camera 10 images the product shelf 50 from above. In this case, the depth camera is used as the camera 10. The depth camera generates a depth image in addition to or instead of a common captured image. As described above, the depth image is an image in which the value of each pixel of the image represents the distance between the imaged item and the camera. FIG. 13 is a diagram illustrating a depth image generated by the camera 10. In the depth image in FIG. 13, pixels representing an item closer to the camera 10 are closer to white (brighter) and pixels representing an item farther from the camera 10 are closer to black (darker). Note that darker portions are densely drawn with larger black dots and brighter portions are sparsely drawn with smaller black dots in FIG. 13 for convenience of illustration.

Figure 14:
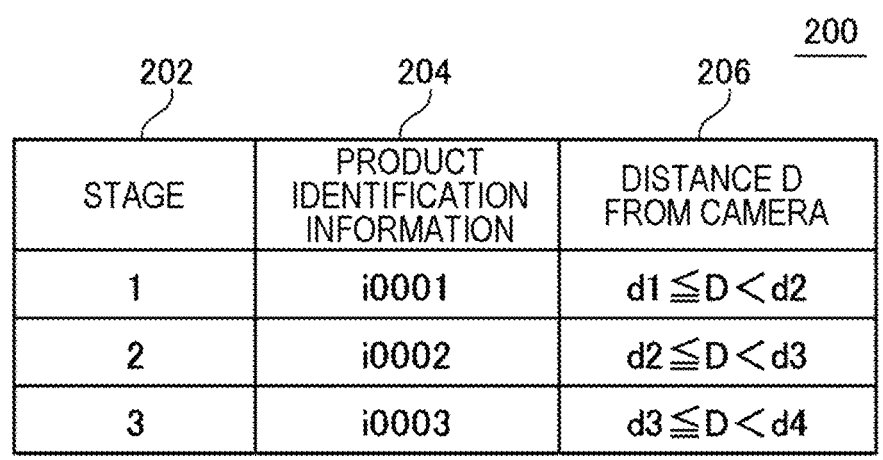
FIG. 14 is a diagram illustrating display information indicating a range of a distance from a camera for each stage of the product shelf.

The determination unit 2060 determines a stage of the product shelf 50 where the reference position 24 is present, based on the value of the pixel representing the reference position 24 in the depth image. At this time, a range of a distance from the camera 10 for each stage of the product shelf 50 is defined in advance in the display information. FIG. 14 is a diagram illustrating display information indicating the range of the distance from the camera 10 for each stage of the product shelf 50. For example, the table 200 in FIG. 14 indicates that the range of the distance between a first shelf of the product shelf 50 and the camera 10 is equal to or larger than d1 and less than d2. In other words, the distance between the top of the first shelf and the camera 10 is d1, and the distance between the top of a second shelf and the camera 10 is d2.

The determination unit 2060 determines a stage of the product shelf 50 where the reference position 24 is present, based on the reference position 24 of the depth image including a scene in which the customer 20 takes out the product 40 and the display information shown in FIG. 14. The determined stage is defined as the stage from which the product 40 is taken out. For example, it is assumed that the pixel at the reference position 24 in the depth image indicates that the distance between the reference position 24 and the camera 10 is a. It is assumed that a is equal to or larger than d1 and equal to or less than d2. In this case, the determination unit 2060 determines that the reference position 24 is present on the first shelf of the product shelf 50 based on the display information shown in FIG. 14. That is, the determination unit 2060 determines that the shelf from which the product 40 is taken out is the first shelf of the product shelf 50.

<<Second Method>>

As a premise, it is assumed that the captured image 12 includes a scene in which the product shelf 50 is viewed from the side. In other words, it is assumed that the camera 10 images the product shelf 50 from the lateral direction. In this case, the determination unit 2060 determines a stage in the product shelf 50 where a position of the reference position 24 in the height direction (Y coordinates) detected from the captured image 12 is present. The determined stage is defined as the stage of the product shelf 50 from which the product 40 is taken out. In this case, the captured image 12 may be a depth image or a common image.

<<About Case where Plurality of Types of Products 40 are Displayed in One Stage>>

A plurality of types of products may be displayed on one stage by dividing one stage of the product shelf 50 into a plurality of columns in the horizontal direction. In this case, the determination unit 2060 respectively determines a position in the horizontal direction and a position in the height direction for the reference position 24 of the hand of the customer 20 who takes out the product 40 from the product shelf 50 to determine the product 40. In this case, the product identification information is shown for each combination of stage and column in the display information. Hereinafter, a method of determining the position of the reference position 24 in the horizontal direction will be described.

It is assumed that the camera 10 images the product shelf 50 from above. In this case, the position of the reference position 24 in the horizontal direction is determined by the X coordinates of the reference position 24 in the captured image 12.

On the other hand, it is assumed that the camera 10 images the product shelf 50 from the lateral direction. In this case, the determination unit 2060 determines the position of the reference position 24 in the horizontal direction using the depth image. Here, the method of determining the position of the reference position 24 in the horizontal direction, using the depth image including a scene in which the product shelf 50 is imaged from the lateral direction, is the same as the method of determining the position of the reference position 24 in the height direction, using the depth image including the scene in which the product shelf 50 is imaged from above.

Note that the method of determining the product 40 to be taken out from the product shelf 50 is described, but the determination unit 2060 may determine the product 40 to be placed on the product shelf 50 by the similar method. However, in this case, the determination unit 2060 uses a captured image 12 including a scene in which the product 40 is placed on the product shelf 50.

Here, it is assumed that "(4) motion of holding the product 40 both before and after the contact with the product shelf 50" is determined as the motion of the customer 20. In this case, the determination unit 2060 may decide whether the products 40 held by the customer 20 before and after the contact between the customer 20 and the product shelf 50 are the same based on the method of determining the product 40 described above. For example, the determination unit 2060 determines the product 40 before the contact between the customer 20 and the product shelf 50 by the same method as the method of determining the product 40 to be placed on the product shelf 50. Furthermore, the determination unit 2060 determines the product 40 after the contact between the customer 20 and the product shelf 50 by the same method as the method of determining the product 40 to be taken out from the product shelf 50. In a case where the two determined products 40 are the same, the determination unit 2060 decides that the products 40 held by the customer 20 before and after the contact between the customer 20 and the product shelf 50 are the same. In this case, it can be said that the motion of the customer 20 is a "motion of reaching for the product shelf 50 to place the product 40, but not placing the product 40". On the other hand, in a case where the two determined products 40 are different from each other, the determination unit 2060 decides that the products 40 held by the customer 20 before and after the contact between the customer 20 and the product shelf 50 are different from each other. In this case, it can be said that the motion of the customer 20 is a "motion of placing the held product 40 and taking out another product 40".

However, the above determination may be performed without specifically determining the product 40. For example, the determination unit 2060 computes magnitude of a difference (difference in area or color) between the foreground region of the analysis target region 30 before the contact between the customer 20 and the product shelf 50 and the foreground region of the analysis target region 30 after the contact between the customer 20 and the product shelf 50 and decides that the products 40 before and after the contact are different from each other in a case where the magnitude of the computed difference is equal to or larger than a predetermined value. On the other hand, the determination unit 2060 decides that the products 40 before and after the contact are the same in a case where the magnitude of the difference is less than the predetermined value.

In addition, for example, the determination unit 2060 decides whether the products 40 before and after the contact are the same based on the difference in the reference positions 24 before and after the contact between the customer 20 and the product shelf 50. In this case, the determination unit 2060 respectively determines, using the display information described above, a stage of the product shelf 50 where the reference position 24 is present before the contact between the customer 20 and the product shelf 50 and a stage of the product shelf 50 where the reference position 24 is present after the contact between the customer 20 and the product shelf 50. In a case where the stages of the product shelf 50 determined respectively before and after the contact between the customer 20 and the product shelf 50 are different from each other, the determination unit 2060 decides that the products 40 before and after the contact are different from each other. On the other hand, in a case where the stages of the product shelf 50 determined respectively before and after the contact are the same, the determination unit 2060 decides that the products 40 before and after the contact are the same.

<Utilization Method of Motion of Customer 20 Determined by Determination Unit 2060>

The motion of the customer 20 determined by the determination unit 2060 can be used to analyze an action performed in front of the product shelf 50 (so-called front-shelf action) by the customer 20. For this reason, the determination unit 2060 outputs various pieces of information such as a motion performed in front of the product shelf 50 by each customer 20, a date and time when the motion is performed, and a product 40 subjected to the motion. This information is, for example, stored in a storage apparatus connected to the information processing apparatus 2000 or transmitted to a server apparatus connected to the information processing apparatus 2000 in a communicable manner. Here, various existing methods can be used as the method of analyzing the front-shelf action based on various motions of the customer 20 performed in front of the product shelf 50.

Note that a usage scene of the information processing apparatus 2000 is not limited to the determination of the motion of the customer in the store. For example, as described above, the information processing apparatus 2000 can be used to determine the motion of a factory worker or the like. In this case, for example, the motion of each worker determined by the information processing apparatus 2000 is compared with a motion of each worker defined in advance, and thus it is possible to confirm whether the worker correctly performs a predetermined job.

The example embodiments of the present invention are described with reference to the drawings. However, the example embodiments are only examples of the present invention, and various configurations other than the above can be employed.

The invention claimed is:

1. An information processing apparatus comprising:
   at least one memory configured to store instructions; and
   at least one processor configured to execute the instructions to:
   detect a reference position indicating a position of a hand of a person included in a captured image from the captured image in which a display place of an item is imaged;
   detect a pose of the hand of the person from the captured image;
   set an analysis region of a predetermined shape on the captured image, the analysis region having a position determined based on the detected reference position and a direction determined based on a direction of the hand defined by the pose of the hand; and
   determine a motion of the person by analyzing the analysis target region,
   wherein the analysis region has two first parallel sides that are parallel to the direction of the hand defined by the pose of the hand and two second parallel sides that are perpendicular to the direction of the hand.

2. The information processing apparatus according to claim 1,
   wherein the at least one processor is further configured to execute the instructions to determine a motion of the person taking out the item from the display place by analyzing the analysis target region set for each of a plurality of captured images generated at different timepoints.

3. The information processing apparatus according to claim 1,
   wherein the at least one processor is further configured to execute the instructions to determine a motion of the person not holding the item by analyzing the analysis target region.

4. The information processing apparatus according to claim 1,
   wherein the at least one processor is further configured to execute the instructions to determine a motion of the person not holding the item both before and after contact with the display place by analyzing the analysis target region set for each of a plurality of captured images generated at different timepoints.

5. The information processing apparatus according to claim 1,
   wherein the at least one processor is further configured to execute the instructions to determine a motion of the person placing the item on the display place by analyzing the analysis target region set for each of a plurality of captured images generated at different timepoints.

6. The information processing apparatus according to claim 1,
   wherein the at least one processor is further configured to execute the instructions to determine a motion of the person holding the item by analyzing the analysis target region.

7. The information processing apparatus according to claim 6,
   wherein the at least one processor is further configured to execute the instructions to determine a motion of the person taking out the item from the display place by analyzing the analysis target region set for each of a plurality of captured images generated at different timepoints.

8. The information processing apparatus according claim 1,
   wherein the at least one processor is further configured to determine the item which is a target of the motion of the person based on display information indicating a position of the item in the display palace and a position of the reference position in a height direction included in the analysis target region.

9. The information processing apparatus according to claim 8, wherein the captured image is a depth image generated by a depth camera that images the display place from above, and wherein the at least one processor is further configured to determine the position of the reference position in the height direction based on a pixel value at the reference position in the depth image.

10. A control method executed by a computer, the method comprising:

detecting a reference position indicating a position of a hand of a person included in a captured image from the captured image in which a display place of an item is imaged;

detecting a pose of the hand of the person from the captured image;

and setting an analysis region of a predetermined shape on the captured image, the analysis region having a position determined based on the detected reference position and a direction determined based on a direction of the hand defined by the pose of the hand; and analyzing the analysis target region to determine a motion of the person, wherein the analysis region has two first parallel sides that are parallel to the direction of the hand defined by the pose of the hand and two second parallel sides that are perpendicular to the direction of the hand.

11. A non-transitory computer-readable storage medium storing a program causing a computer to execute:

detecting a reference position indicating a position of a hand of a person included in a captured image from the captured image in which a display place of an item is imaged;

detecting a pose of the hand of the person from the captured image;

and setting an analysis region of a predetermined shape on the captured image, the analysis region having a position determined based on the detected reference position and a direction determined based on a direction of the hand defined by the pose of the hand; and analyzing the analysis target region to determine a motion of the person, wherein the analysis region has two first parallel sides that are parallel to the direction of the hand defined by the pose of the hand and two second parallel sides that are perpendicular to the direction of the hand.

* * * * *